US007124335B2

(12) United States Patent
Choi et al.

(10) Patent No.: US 7,124,335 B2
(45) Date of Patent: Oct. 17, 2006

(54) APPARATUS AND METHOD FOR TESTING MEGACO PROTOCOL

(75) Inventors: Gil Young Choi, Daejeon (KR); Kyou Ho Lee, Daejeon (KR); Dong Guk Je, Daejeon (KR); Jaewoo Park, Daejeon (KR)

(73) Assignee: Electronics and Telecommunications Research Institute, (KR)

( * ) Notice: Subject to any disclaimer, the term of this patent is extended or adjusted under 35 U.S.C. 154(b) by 255 days.

(21) Appl. No.: 10/910,759

(22) Filed: Aug. 2, 2004

(65) Prior Publication Data

US 2005/0149787 A1    Jul. 7, 2005

(30) Foreign Application Priority Data

Dec. 3, 2003    (KR) .................. 10-2003-0087270

(51) Int. Cl.
*G01R 31/28*    (2006.01)
(52) U.S. Cl. .................. 714/712; 370/250; 379/22
(58) Field of Classification Search ............. 455/435.1; 370/352, 250, 252; 702/122; 379/22; 714/712
See application file for complete search history.

(56) References Cited

U.S. PATENT DOCUMENTS 5,581,596 A * 12/1996 Hogan .................. 455/435.1

6,697,358 B1 *  2/2004  Bernstein .................. 370/352
6,795,789 B1 *  9/2004  Vandiver .................. 702/122
6,804,328 B1 * 10/2004  Perry et al. .................. 379/22
7,012,899 B1 *  3/2006  Hagler et al. .............. 370/252

FOREIGN PATENT DOCUMENTS

| KR | 010000267 A | 1/2001 |
| KR | 1020020036327 A | 5/2002 |
| KR | 1020030033632 A | 5/2003 |
| KR | 10-2003-0081953 | 10/2003 |

* cited by examiner

*Primary Examiner*—David Ton
(74) *Attorney, Agent, or Firm*—Blakely Sokoloff Taylor & Zafman (57) ABSTRACT

Provided are an apparatus and method for testing call processing performance and conformance of a media gateway controller and a media gateway with respect to a media gateway control (MEGACO) protocol. The method includes generating a predetermined scenario regarding a test of call processing performance of a media gateway controller or a media gateway; selecting a function of the media gateway controller or the media gateway and emulating virtual analog lines between the media gateway controller and the media gateway according to the scenario; and testing the call processing performance of the media gateway controller or the media gateway using the virtual analog lines and the selected media gateway controller or the media gateway. Accordingly, it is possible to effectively test the call processing performance of the media gateway controller or a media gateway without test equipment.

10 Claims, 9 Drawing Sheets

| CONNECTION ID (410) | AGW ID (420) | CHANNEL ID (430) | DIGIT NUMBER (440) | REMOTE NUMBER (450) | STATUS (460) |
|---|---|---|---|---|---|
| 10001 | 1 | 0001 | 101-100-0001 | | |
| 10002 | 1 | 0002 | 101-100-0002 | | |
| 10003 | 1 | 0003 | 101-100-0003 | | |
| ... | ... | ... | ... | | |
| 19998 | 1 | 9998 | 101-100-9998 | | |
| 19999 | 1 | 9999 | 101-100-9999 | | |
| 20001 | 2 | 0001 | 102-200-0001 | | |
| 20002 | 2 | 0002 | 102-200-0002 | | |
| ... | ... | ... | ... | | |
| 29998 | 2 | 9998 | 102-200-9998 | | |
| 29999 | 2 | 9999 | 102-200-9999 | | |
| ... | ... | .... | .... | | |

AGW : ACCESS GATEWAY

APPARATUS AND METHOD FOR TESTING MEGACO PROTOCOL

BACKGROUND OF THE INVENTION

This application claims the priority of Korean Patent Application No. 2003-87270 filed on Dec. 3, 2003 in the Korean Intellectual Property Office, the disclosure of which is incorporated herein in its entirety by reference.

1. Field of the Invention

The present invention relates to an apparatus and method for testing a MEdia GAteway COntrol (MEGACO) protocol, and more particularly, to an apparatus and method for testing call processing performance and conformance of a standard MEGACO protocol-based Media Gateway Controller (MGC) and an Access GateWay (AGW) when replacing a conventional analog switchboard with the AGW so as to construct a Next Generation Network (NGN) that converges voice traffic, which has been serviced by a conventional Public Switched Telephone Network (PSTN), onto an Internet Protocol (IP) net.

2. Description of the Related Art

In general, a next-generation network indicates a converged Internet Protocol (IP) network that converges various multimedia traffic, such as data and audio, onto an IP packet network. This next-generation network is capable of providing Voice-over-IP (VoIP) service as an alternative to the existing Public Switched Telephone Network (PSTN) service. The VoIP is a more economical alternative to the existing circuit switching or the PSTN service.

An Access GeteWay (AGW) has been introduced as a VoIP-based apparatus that can substitute for the existing analog switchboard. In other words, the AGW is converging access equipment that enables various subscriber services, such as general telephone service, Digital Subscriber Line (xDSL) service, and private line service, to be accommodated in a single platform. In this case, an accommodated voice traffic is transmitted over a local switching system and the V5.2 interface, and a data traffic is transmitted over a data network. Also, the AGW is connected to a soft switch to transmit voice packet traffic to a packet network and provides packet-based extensibility for accommodation of new subscribers. To accept voice traffic of a conventional Time Division Multiplexing (TDM) network in an IP packet network, the voice traffic must be packetized, and call processing must be performed on the voice traffic by connecting the IP packet network to the conventional TDM network and using a protocol for transmitting the voice traffic to the soft switch.

Establishment of a next-generation network infrastructure has now been carried by several telecommunication providers. In this connection, development of related equipment and technologies for testing the performance thereof are required.

A MEdia GAteway COntrol (MEGACO)/H.248 protocol is a control protocol between the soft switch and a gateway that is standardized according to the Internet Engineering Task Force (IETF) and the International Telecommunication Union-Telecommunication (ITU-T). Also, the MEGACO/H.248 protocol is a master-slave type protocol that instructs a Media Gateway (MG) to connect two MGs, which are terminated by a signal control of a Media Gateway Controller (MGC), or manage them. In particular, an Access GateWay (AGW) performs the same functions as those of a conventional analog switching system in an IP net.

SUMMARY OF THE INVENTION

The present invention provides an apparatus and method for testing a MEdia GAteway COntrol (MEGACO) protocol by realizing various test environments under which the call processing performance of a Media Gateway Controller (MGC) controlling an Access GateWay (AGW) or the AGW, or protocol functions are tested without test equipment.

According to an aspect of the present invention, there is provided an apparatus for testing a media gateway control (MEGACO) protocol, the apparatus comprising a test application controller generating a predetermined scenario required to test call processing performance of a media gateway controller or a media gateway; a test engine unit selecting a function of the media gateway controller or the media gateway and emulating virtual analog lines according to the scenario; and an MEGACO protocol processor processing calls of the analog lines using the selected media gateway controller or the media gateway.

According to another aspect of the present invention, there is provided a method of testing a media gateway control (MEGACO) protocol, the method comprising generating a predetermined scenario regarding a test of call processing performance of a media gateway controller or a media gateway; selecting a function of the media gateway controller or the media gateway and emulating virtual analog lines between the media gateway controller and the media gateway according to the scenario; and testing the call processing performance of the media gateway controller or the media gateway using the virtual analog lines and the selected media gateway controller or the media gateway.

Accordingly, it is possible to test the call processing performance of the Media GateWay (MGW) or the MGC without related equipment.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings. Like reference numerals represent like elements throughout the drawings.

The present invention provides a method and apparatus for effectively testing the call processing performance and conformance of a Media Gateway Controller (MGC) and an Access GateWay (AGW) by virtually emulating a lot of analog lines that can be connected to the AGW and selectively emulating the AGW and the MGC.

Figure 1:
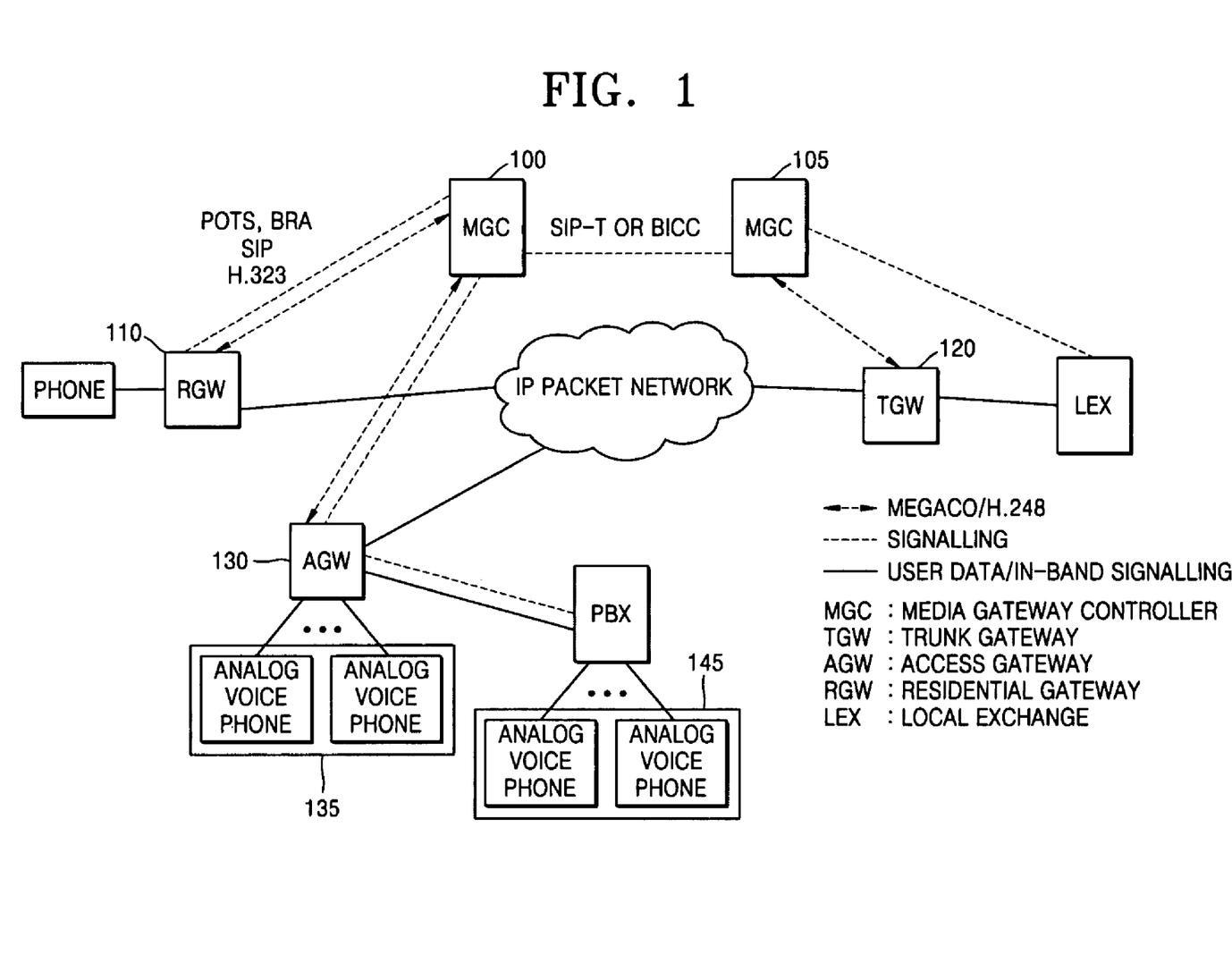
FIG. 1 illustrates a construction of a media gateway control network to which the present invention is applied.

FIG. 1 illustrates a construction of a Media GateWay (MGW) control network to which the present invention is applied. In detail, FIG. 1 illustrates a construction of a next-generation network that converges a Public Switched Telephone Network (PSTN) onto an Internet Protocol (IP)-based packet network 150. A standard protocol for the next-generation network includes the MEdia GAteway COntrol (MEGACO)/H.248 standardized by the Internet Engineering Task Force (IETF) and the International Telecommunication Union-Telecommunication (ITU-T). A MEGACO/H.248-based MGW control network includes MGCs 100 and 105 and Media Gateways (MGs) 110, 120, and 130.

In general, a network includes at least one of the MGCs 100 and 105. The MGCs 100 and 105 sets service connection by controlling MGs 110, 120, and 130. A Session Initiation Protocol-Television (SIP-T) or a Bearer Independent Call Control (BICC) protocol is used between the MGCs 100 and 105. The MGs 110, 120, and 130 convert a media in a network into a media in another network. According to their characteristics, the MGs 110, 120, and 130 are categorized into a Residential GateWay (RGW) 110, a Trunk GateWay (TGW) 120, and an Access GateWay (AGW) 130.

Figure 2:
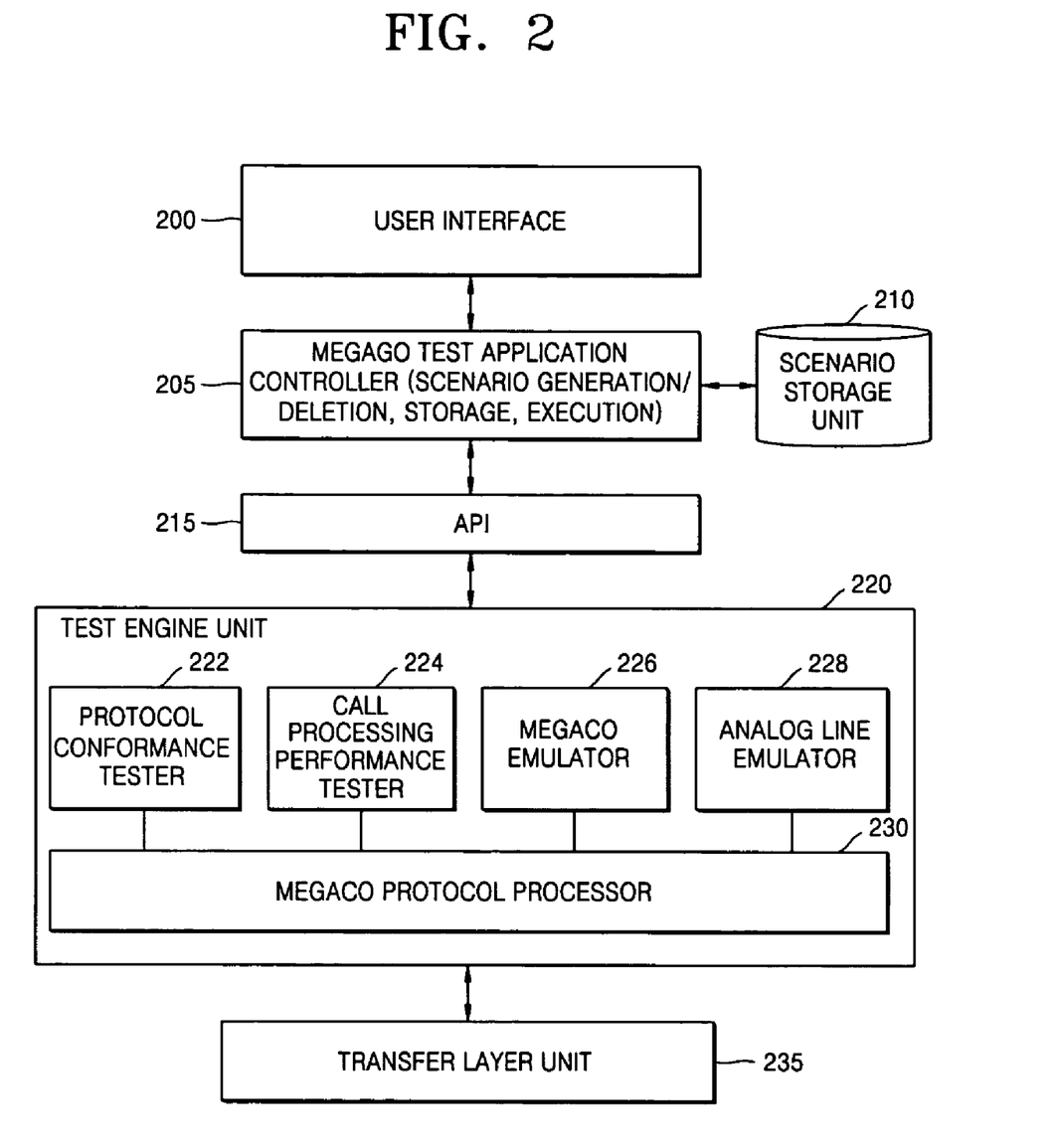
FIG. 2 is a block diagram of an apparatus for testing a MEdia GAteway COntrol (MEGACO) protocol according to an embodiment of the present invention.

FIG. 2 is a block diagram of an apparatus for testing an MEGACO protocol, according to an embodiment of the present invention. The apparatus of FIG. 2 includes a user interface 200, a MEGACO test application controller 205, a scenario storage unit 210, an Application Program Interface (API) 215, a test engine unit 220, and a transfer layer unit 235.

The test engine unit 220 includes a MEGACO protocol processor 230 that allows common use of a protocol stack function performed by an MG or an MGC. The MEGACO test application controller 205 performs various scenarios provided by the test engine unit 220 that includes the MEGACO protocol processor 230.

More specifically, the user interface 200 provides an interface between a user and the apparatus of FIG. 2. The user sends a command that instructs the apparatus of FIG. 2, via the user interface 200, to generate, delete, store, or execute a scenario required to test an MEGACO protocol.

The MEGACO test application controller 205 receives the command via the user interface 200, and generates, deletes, or stores the scenario. Also, in receipt of the command, the MEGACO test application controller 205 performs an operation specified in the scenario. The MEGACO test application controller 205 is connected to the test engine unit 220 via the API 215 and instructs the test engine unit 220 to perform control operations according to the scenario.

Figure 4:
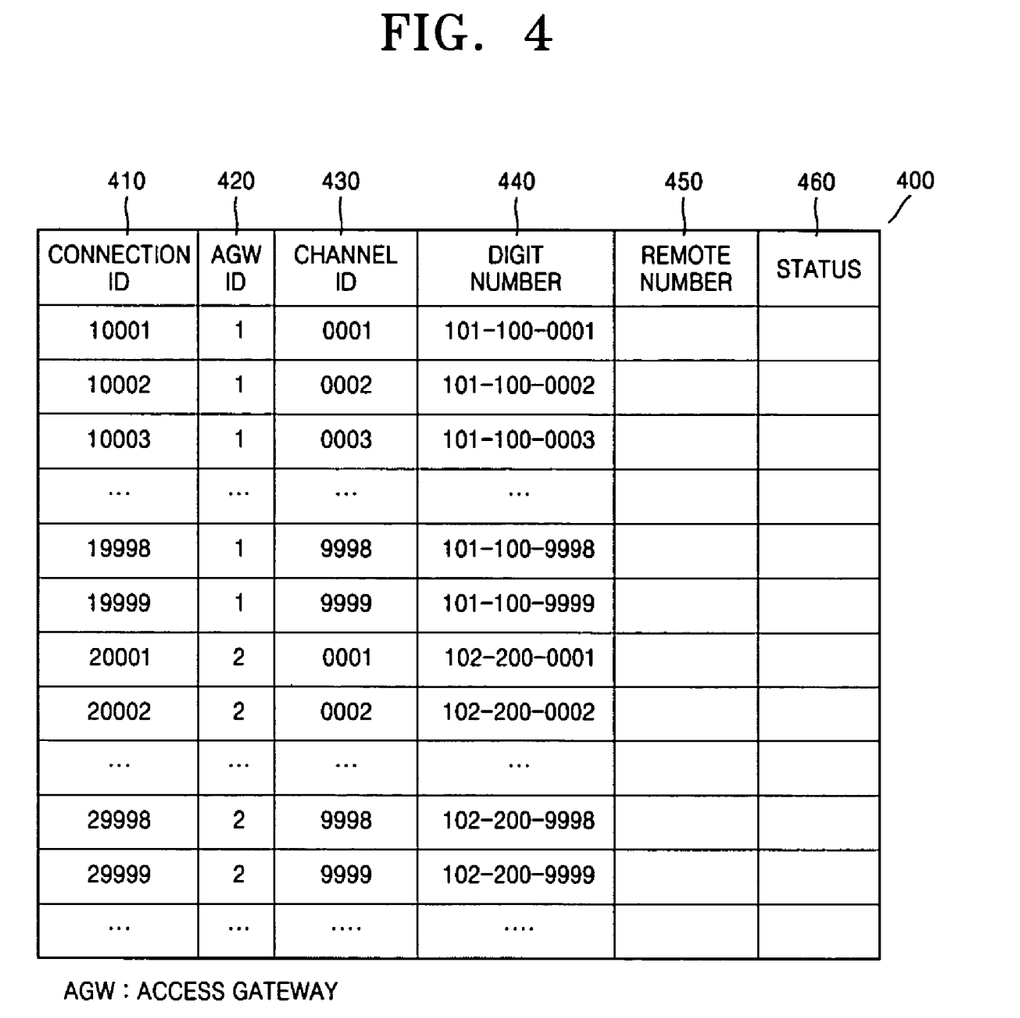
FIG. 4 is an analog line resource table of an Access GateWay (AGW) according to an embodiment of the present invention.

Further, the MEGACO test application controller 205 receives an AGW identifier (ID) field 420 of FIG. 4 that is an AGW classification information required for an analog line that needs to be emulated during an initialization process, the channel ID field 430 that is classification information that are constructed by respective AGWs and must be emulated, and initial values and a total channel number of a digit number field 440 specifying telephone numbers of channels. Next, the MEGACO test application controller 205 constructs and manages virtual analog lines for emulation of the MG and the MGC using a predetermined method, such that values of the virtual analog lines are sequentially increased starting from their initial values.

The scenario storage unit 210 stores scenarios regarding a test of the call processing performances of the MGC and the MG. The scenarios stored in the scenario storage unit 210 are managed by the MEGACO test application controller 205.

The test engine unit 220 includes a protocol conformance tester 222, a call processing performance tester 224, an MEGACO protocol emulator 226, an analog line emulator 228, and the MEGACO protocol processor 230. The MEGACO protocol processor 230 supports MGC and MG functions of the MEGACO protocol and selects the MGC function or the MG function according to the construction of a test network selected by the user.

The analog line emulator 228 emulates a plurality of virtual analog lines that can be access the AGW 130. That is, the analog line emulator 228 virtually generates lines of analog phones 135 and 145 of FIG. 1 that operate while being connected to the AGW 130, and constructs a test environment where the call processing performance of the MGC 100 is tested using the virtually generated lines of the analog phones 135 and 145. Accordingly, the analog line emulator 228 enables generation of various environments required to test the call processing performance of the MGC and MG 130 without use of complicated equipment.

The transfer layer unit 235 is connected to the test engine unit 220 and receives messages from and/or transmits messages to external MGC or MG.

A test scenario for a protocol conformance or call processing performance will be later described in greater detail with reference to FIGS. 6A through 6E.

Figure 3:
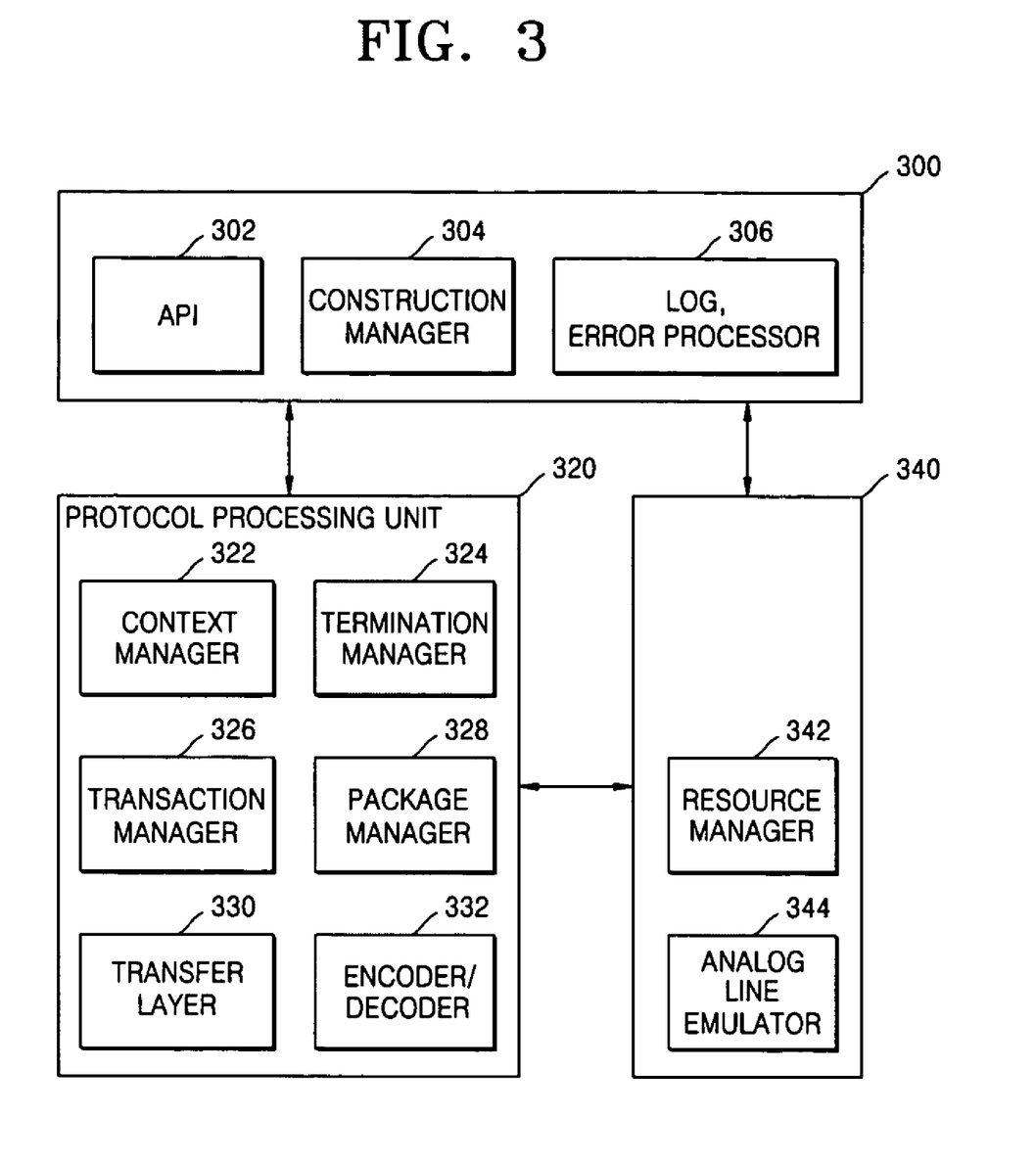
FIG. 3 is a block diagram illustrating a processing unit of an MEGACO protocol according to an embodiment of the present invention.

FIG. 3 is a block diagram illustrating a MEGACO processing unit according to an embodiment of the present invention.

As described above, the MEGACO protocol enables an interface between the Internet and another type of a cable network, suggested by both the IETF and the ITU-T. In particular, RFC 3015 and H.248 MEGACO protocol versions are recommended by the IETF and ITU-T, respectively. Unlike other types of packet telephony protocols, the MEGACO protocol is present as an interface protocol between upper and lower layers.

In other words, the upper layer of the MEGACO protocol provides conception of services/calls but the lower layers of the MEGACO protocol substantially controls objects such as a DS0 channel, a trunk, a phone line, an Asynchronous Transfer Mode (ATM) channel, and a voice file. The MEGACO protocol operates based on a connection model that consists of logical entities or objects controlled by the soft switch or the MGC.

Two basic factors of the MEGACO/H.248 connection model are a termination and a context. In general, the termination indicates a source or sink of a media flow. Alternatively, the termination may indicate a source or sink of a media flow in the MG. The termination may either remain for a long time like a line or remain temporarily like a Real-Time Transport Protocol (RTP) session.

The context denotes association of terminations. A media traffic is routed between terminations in the same context. The MEGACO/H.248 connection model uses commands that instruct terminations to be added to, changed in, or detected from the context so as to control its context and terminations. Also, the MEGACO/H.248 connection model describes details, e.g., contents and operations, of events that must be dealt by terminations, using the commands.

Referring to FIG. 3, the MEGACO protocol connection model is a connection model in a gateway rather than between terminations. Specifically, the MEGACO protocol connection model consists of terminations and contexts and is a connection model of controlling the connection type of media stream, resource allocation for connection and conversion of the media stream between a circuit network and a packet network that are terminated in the gateway.

The terminations and contexts are logical entities controlled by an MGC. The context specifies the relations between terminations in the gateway and is created, changed, or deleted in response to a command from the MGC.

A MEGACO protocol processing unit 320 processing the MEGACO protocol includes a context manager 322, a termination manager 324, a transaction manager 326, a package manager 328, a transfer layer 330, and an encoder/decoder 332. The context manager 322 analyzes and performs a command regarding context processing. The termination manager 326 allocates, changes, or releases information regarding terminations. The transaction manager 326 receives a request for transaction, responds to the request, or pends the transaction. The package manager 328 processes package information that must be supported according to the type of an MG. The encoder/decoder 332 converts an MEGACO message into a text or binary digits or performs the reverse operation.

The protocol processing unit 320 is connected to an analog line emulator 344 that generates information regarding emulation of an analog line of the AGW and performs operations suggested in the information, and a resource manager 342 that provides resource information regarding line emulation.

FIG. 4 is an analog line resource table 400 of an AGW according to an embodiment of the present invention. The analog line resource table 400 includes a connection ID field 410, the AGW ID field 420, the channel ID field 430, the digital number field 440, a remote number field 450, and a status field 460.

During an initialization process, the analog line resource table 400 is constructed and managed by the MEGACO test application controller 205, based on information received from a user via the user interface 200. The test engine unit 220 performs analog line emulation as specified in the analog line resource table 400.

The connection ID field 410 is an identifier that distinguishes resources of the MEGACO test application controller 205 and the test engine unit 220. The AGW ID field 420 is an AGW identifier. The channel ID field 430 is a channel identifier that distinguishes channels of respective AGWs.

The digit number field 440 lists a phone number of corresponding channels and the remote number field 450 indicates phone number of the other party when setting call connection. The status field 460 describes the status of a call.

In the connection ID field 410, unique values are allocated for easy table lookup in an apparatus for testing a MEGACO protocol according to the present invention. According to the present invention, there are two types of AGW resources: an analog line connected to the AGW, and an RTP channel connected to an IP packet network. The analog line is an MEGACO termination that is physically fixed, and the RTP channel is a temporary MEGACO termination that can be allocated if necessary.

The construction of the analog line resource table 400 is not limited to the above description, that is, the analog line resource table 400 can be variously constructed as a user desires. Use of the connection ID field 410 allows fast lookup of this table 400. Also, the channel ID field 430 and the digit number field 440 are sequentially, automatically set according to a total number of channels, specified in the information received during the initialization process.

Figure 5:
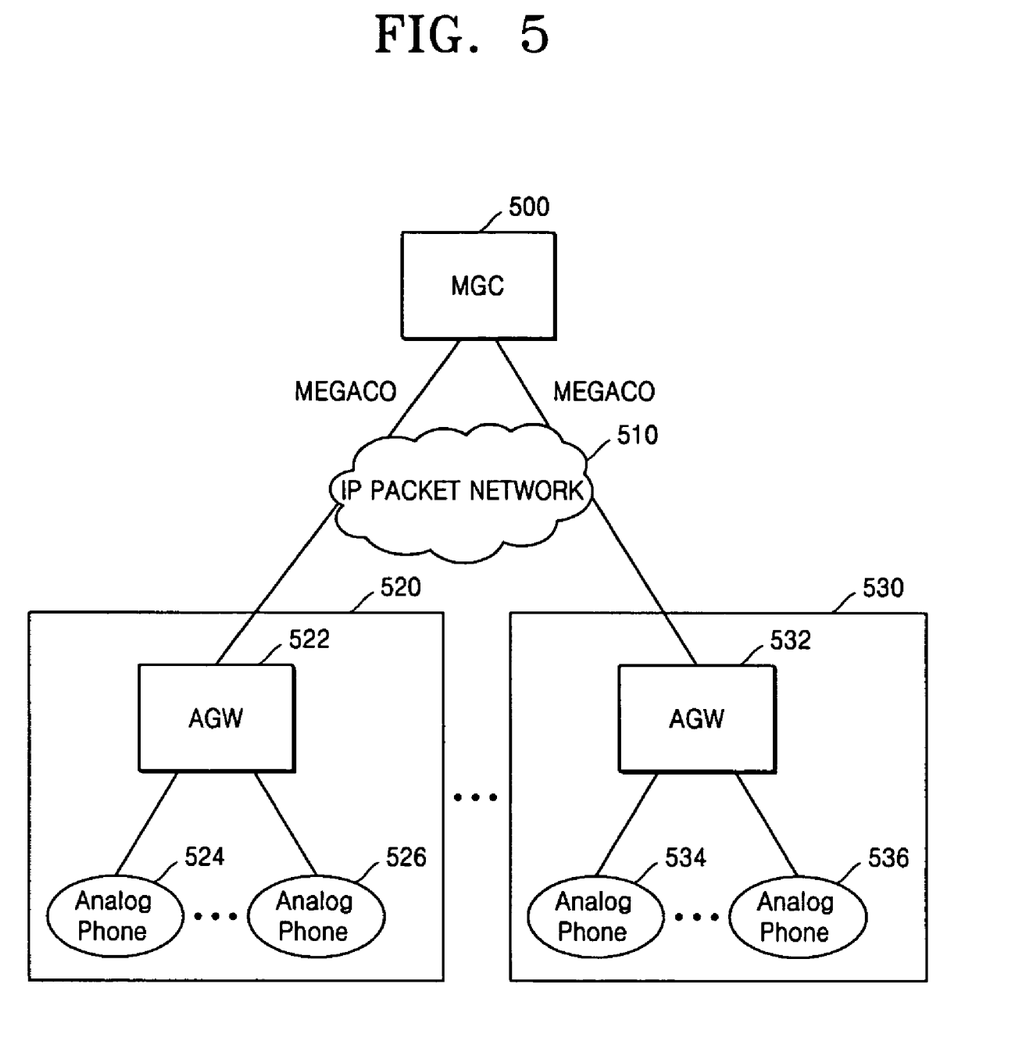
FIG. 5 illustrates a topology of a network test environment to which the present invention is applied.

FIG. 5 illustrates a topology of a network test environment to which the present invention is applied. Referring to FIG. 5, the network test environment includes an MGC 500, and AGW2 522 and 532 connected to an IP network 510, access subscriber networks 520 and 530 that include analog phones 524, 526, 534, and 536 connected to the AGWs 522 and 532.

An MEGACO protocol is used as a control protocol between the MGC 500 and the AGWs 522 and 532. There are various topologies of a network test environment available for the present invention. For instance, in a network test environment, one AGW may be connected to one MGC, at least two AGWs may be connected to one MGC, one AGC may be connected to two MGCs, or at least two AGWs may be connected to two MGCs. The construction of the network test environment is not limited, that is, the network test environment can be variously constructed as a user desires.

FIGS. 6A through 6E illustrate an initialization process and a test scenario according to embodiments of the present invention. In FIGS. 6B through 6E, illustration of a response message to a message requesting a MEGACO protocol is omitted for convenience.

Figure 6A:
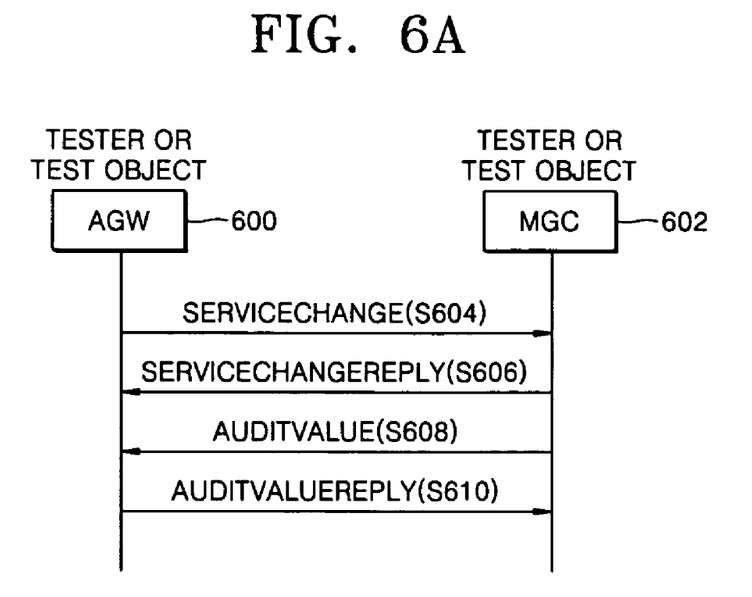
FIGS. 6A through 6E illustrate scenarios of an initialization process and test according to an embodiment of the present invention.

FIG. 6A illustrates an initialization process performed between an AGW 600 and an MGC 620. Referring to FIG. 6A, when the AGW 600 restarts and can provide services, it transmits a command ServiceChange to the MGC 602 using a default communication port specified in the MEGACO protocol standard (S604). When the command ServiceChange is acceptable, the MGC 602 transmits a command ServiceChangeReply to the AGW 600 (S606).

Next, the MGC 602 sends a command AuditValue, which instructs the AGW 600 to provide information regarding its state, to a root termination of the AGW 600 AGW (S608). In response to the command AuditValue, the AGW 600 sends the information regarding its state to the MGC 602, together with a command AuditValueReply (S610), thereby completing the initialization process between the AGW 600 and the MGC 602. In this regard, the AGW 600 or the MGC 602 may be an object of the initialization process.

Figure 6B:
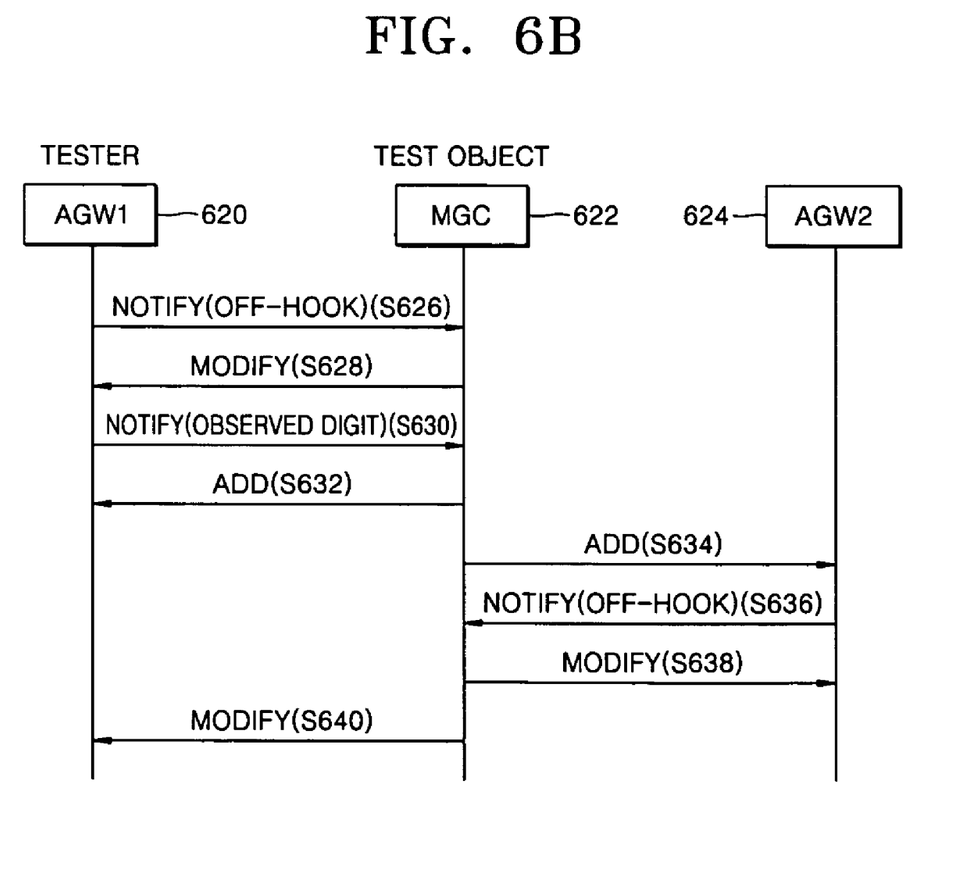

FIG. 6B illustrates a method of setting a call to test the call processing performance of an MGC 622, according to an embodiment of the present invention. Referring to FIG. 6B, a first AGW 620 acts as an apparatus for testing the call processing performance of the MGC 622, and the MGC 622 connected to the first AGW 620 is a test object. A second AGW 624 is further required for a test of call connection between two AGWs. The second AGW 624 may be replaced with the MEGACO protocol emulator 226 and the analog line emulator 228 of FIG. 2.

In a network comprised of the AGWs 620 and 624 and the MGC 622, the call processing performance of the MGC 622 can be tested by evaluating its capability of setting or releasing call connection per unit time between a plurality of analog phone subscribers accessing the AGWs 620 and 624 that substitute for a conventional analog local switching system. For the test, the capability of the MGC 622 may be evaluated by measuring a number of Calls Per Second (CPS) and Busy Hour Call Attempts (BHCAs).

In this test, the AGWs 620 and 624 act as an apparatus for testing the call processing performance of the MGC 622. The apparatus is capable of generating and releasing virtual calls as specified by a scenario, and enabling analog line emulation that provides virtual analog subscriber lines of the AGWs 620 and 624. Accordingly, it is possible to test the call processing performance of the MGc 622 without test equipment.

According to the scenario of call setting shown in FIG. 6B, the first AGW 620 generates a command notify (off-hook) that includes an off-hook event that indicates the status of an analog phone to be pick up, and sends it to the MGC 622 (S626). Then, the MGC 622 sends a reply message (not shown) to the received command notify (off-hook) to the first AGW 620.

Next, the MGC 622 sends the first AGW 620 a command Modify that instructs properties of a termination that off-hooks the analog phone, an event, and a signal therefor to be modified (S628). For instance, the MGC 622 requests that the first AGW 620 to monitor digits of a destination phone number of a receiving side, entered by the off-hook analog phone.

Next, upon receipt of the command Modify, the first AGW 620 determines digit numbers listed in the digit number field 440 according to the scenario using the analog line emulator 228, and sends the MGC 622 a command Notify(observed Digit) that includes the remote number field 450 listing the destination phone number (S630). In response to the command Notify(observed Digit), the MGC 622 sends the first AGW 620, which is a transmitting side, a command Add that instructs the termination to be connected to a related context (S632). Next, the MGC 622 also sends the command Add to the second AGW 624 that is a receiving side (S634).

Next, the second AGW 624 detects whether an analog phone connected to itself accessing the second AGW 624 is pick up, and sends the MGC 622 a command Notify(off-hook) informing this fact when the analog phone is hooked off (S636). When the MGC 622 sends the first and second AGWs 620 and 624 a command Modify that instructs an event that requires monitoring of an on-hook signal with respect to the termination to be performed (S638 and S640), setting of call connection between analog phones connected to the first and second AGWs 620 and 624 is completed. The first AGW 620 of FIG. 6B, which is a tester according to the present invention, sends a request for setting a plurality of calls to the MGC to test the call processing performance of the MGC 622.

Figure 6C:
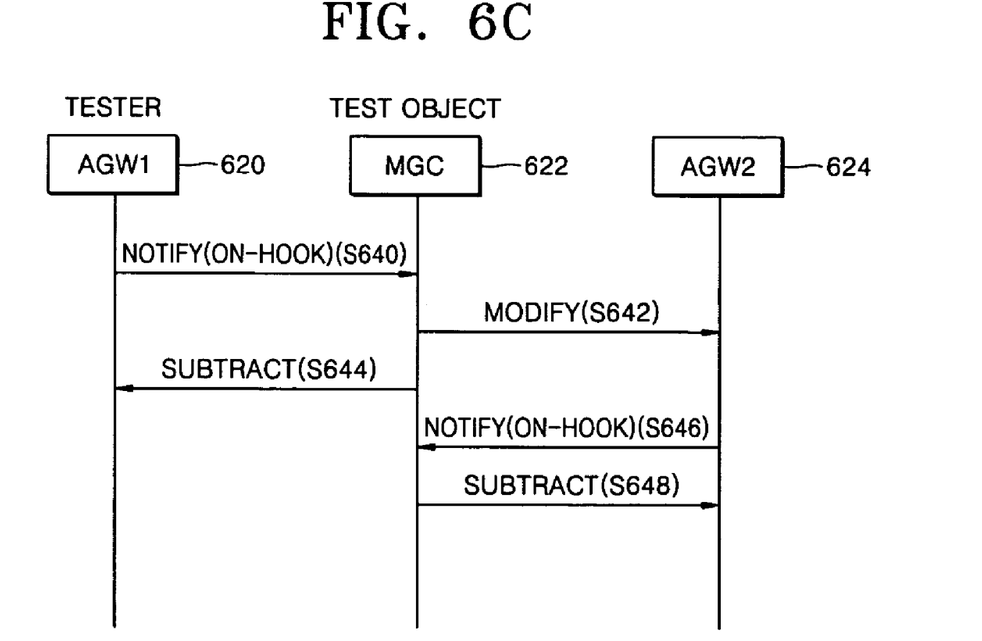

FIG. 6C illustrates a method of releasing a call to test the call processing performance of the MGC 622 according to an embodiment of the present invention. Referring to FIG. 6C, the first AGW 620, i.e., a tester according to the present invention, generates a command Notify(on-hook) instructing an on-hook event that a busy phone of a termination connected to the first AGW 620 must go on-hook to terminate the connection to be performed, and sends the command Notify(on-hook) to the MGC 622 (S640).

In receipt of the command Notify(on-hook), the MGC 622 sends the second AGW 624 a command Modify instructing operations related to disconnection of the corresponding termination to be performed (S642). Next, the MGC 622 sends the first AGW 620 a command Subtract instructing the termination to be deleted from a related context (S644).

When a phone connected to the second AGW 624 goes on-hook in response to the command Modify instructed by the MGC 620, the second AGW 624 perceives this fact, generates a command Notify(on-hook), and sends it to the MGC 622 (S646). Then, in response to the command Notify(on-hook), the MGC 622 sends the second AGW 624 a command Subtract instructing a corresponding termination to be deleted to a related context (S648), thereby completing the method of FIG. 6C.

Figure 6D:
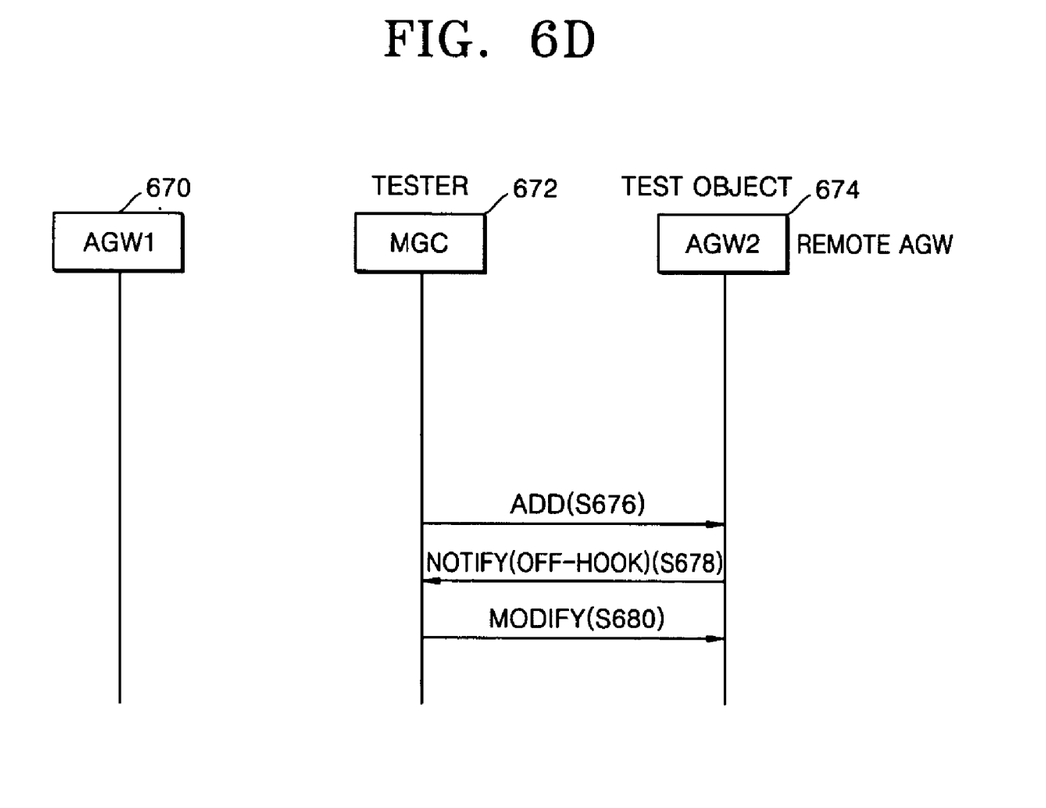

FIG. 6D illustrates a method of setting a call to test the call processing performance of a second AGW 674 according to an embodiment of the present invention. Referring to FIG. 6D, an MGC 672 and the second AGW 674 are set as a tester and a test object, respectively. In this test, the MGC 672 periodically, repeatedly sets a call to the second AGW 674 and releases the cal therefrom for a predetermined time so as to test the call processing performance of the second AGW 674.

In this embodiment, according to a test scenario, it is assumed that the MGC 672 receives a request for call setting from a first AGW 670 that is a transmitting party and the second AGW 674 is a receiving party. The method of FIG. 6D is similar to the method of FIG. 6B performed between the MGC 622 and the second AGW 624. More specifically, the MGC 672 sends a command Add to the second AGW 674 that is the receiving party (S676). Next, when a phone connected to the second AGW 674 goes on-hook, the second AGW 674 perceives it and sends the MGC 672 a command Notify(off-hook) (S678).

Next, the MGC 672 sends the second AGW 674 a command Modify instructing an event that a signal output from the on-hook phone must be monitored to be performed (S680) and the method of FIG. 6D ends.

In the method of FIG. 6D, it is possible to set a call to the first AGW 670 simultaneously together with setting a call to the second AGW 674, using the same scenario.

Figure 6E:
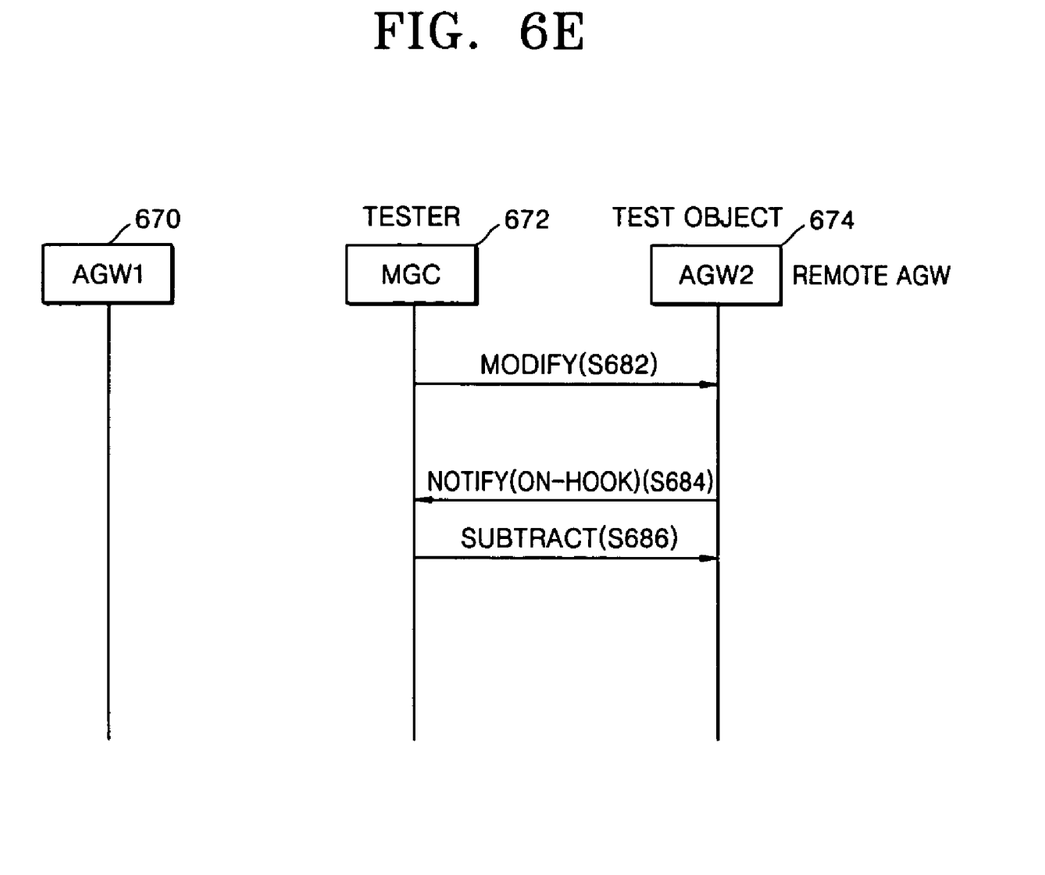

FIG. 6E illustrates a method of releasing a call to test the call processing performance of the second AGW 674, according to an embodiment of the present invention. The method of FIG. 6E is similar to that of FIG. 6C performed between the MGC 622 and the second AGW 624.

More specifically, the MGC 672 sends the second AGW 674 a command Modify instructing operations related to releasing of the termination to be performed (S682). In receipt of the command Modify, the second AGW 674 perceives that a phone connecting to the second AGW 674 goes on-hook, and generates a command Notify(on-hook) and sends it to the MGC 672 (S684).

In response to the command Notify(on-hook), the MGC 672 sends the second AGW 674 a command Subtract instructing the termination to be deleted from a related context (S686), and the method of FIG. 6D ends.

During the method of FIG. 6E, it is possible to release a call from the first AGW 670 simultaneously together with releasing a call from the second AGW 674, using the same scenario. Also, it is possible to make a scenario specifying methods, shown in FIGS. 6B through 6D, of setting, maintaining, and releasing call connection to be performed within a cycle. In this case, a user can perform the test specified the scenario for a predetermined time and obtains a result of test regarding numbers of connected calls, call connection failures, and MEGACO messages.

Figure 7:
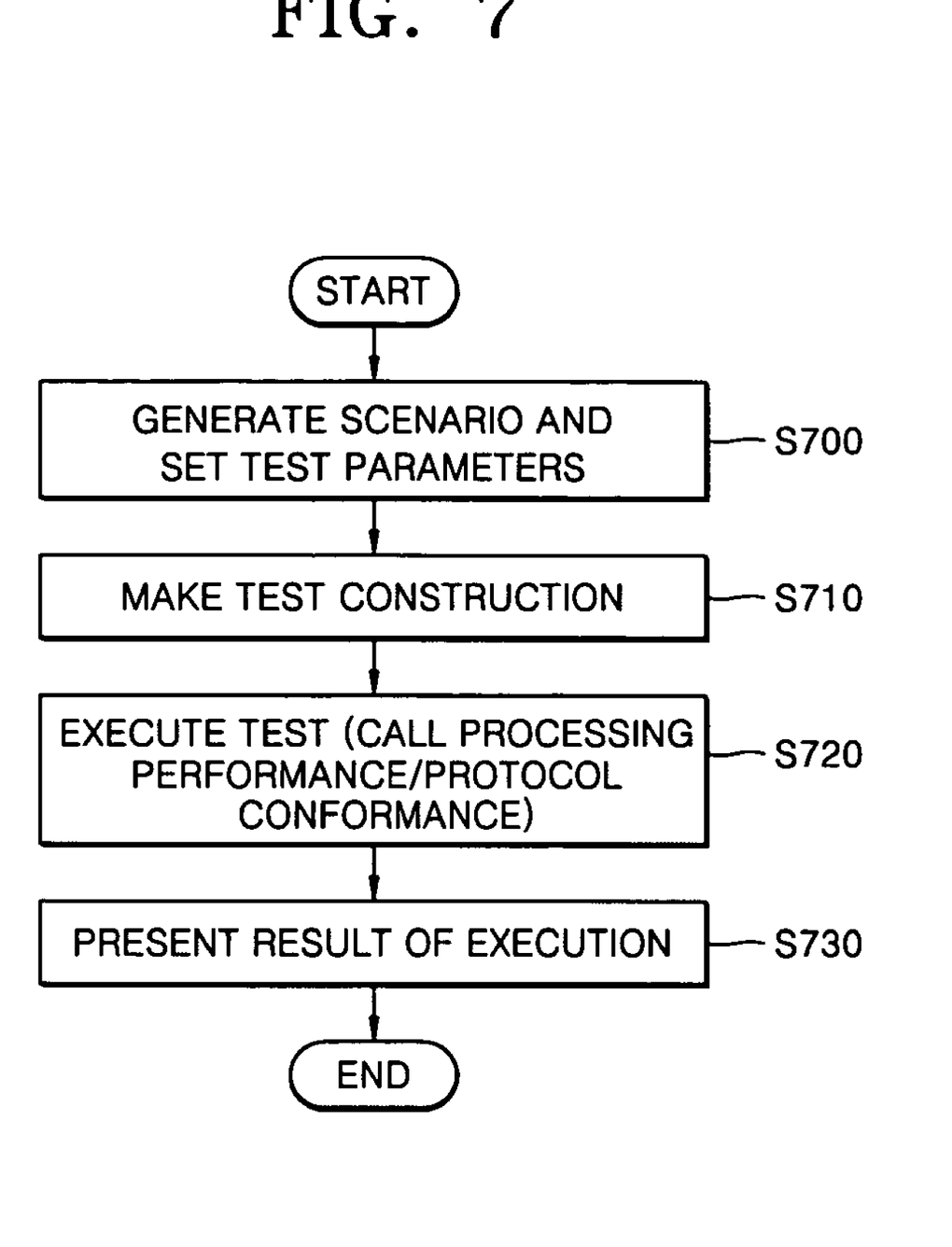
FIG. 7 is a flowchart illustrating a method of testing an MEGACO protocol, according to an embodiment of the present invention.

FIG. 7 is a flowchart illustrating a method of testing a MEGACO protocol according to an embodiment of the present invention. An apparatus used in this method selectively performs the MEGACO protocol including an MGC and an MG in accordance with a construction of a test network selected by a user. Also, in response to user input given via the user interface 200 of FIG. 2, the apparatus creates and stores a scenario for the test, and sets test parameters (S700). Next, the apparatus makes test constructions using the parameters set according to the scenario (S710). The MEGACO test application controller 205 executes the scenario together with the test engine unit 220 (S720) and presents a result of execution via the user interface 200 (S730).

After creation and execution of the scenario, according to the scenario, the apparatus provides the test engine unit 220 that includes the MGC or MG protocol and emulates virtual analog lines, and tests the call processing performance and conformance of a media (or access) gateway and an MGC connected via an IP network (S720). That is, the apparatus emulates a lot of virtual analog lines connected to the access gateway to effectively test the call processing performance of the MGC.

During the emulation, the MEGACO test application controller 205 provides the analog line resource table 400 that differentiates the analog lines from one another in the test.

The analog line resource table 400 includes the connection ID field 410 that is available for easy table lookup; the AGW ID field 420 that differentiates AGWs from one another; the channel ID field 430 that differentiates channels, which are to be constructed and emulated by the respective AGWs, from one another; a digit number field 440 indicating channel phone numbers; the remote number field 450 indicating relative phone numbers of the other party related to call connection; and the status field 460 representing a call connection state.

In S720, call connection, maintenance of call connection for a predetermined time, and releasing call connection after the predetermined time, are performed using the command of the MEGACO protocol.

The apparatus repeats call connection, maintenance of call connection, and releasing of call connection for a predetermined time, specified in the scenario. In this case, it is possible to set values of a call connection speed per hour. The MEGACO test application controller 205 collects statistics of a result of the scenario; presents them to a user; and obtains and stores logarithms of call connection failures, or presents the user a cause of the call connection failures (S730).

The present invention can be embodied as a computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable recording medium can be distributed among computer systems that are interconnected through a network, and the present invention may be stored and implemented as a computer readable code in the distributed system.

As described above, according to the present invention, a role of an MGC or MG protocol is selectively performed according to the topology of network test environment constructed by a user so as to test the call processing performance and conformance of an MGC and an AGW. Also, it is possible to effectively test the call processing performance of the MGC and the AGW by emulating a lot of virtual analog lines connected to the AGW. In addition, it is possible to make a test environment in which the call processing performance and conformance of the MGC and the AGW are tested, using a lot of MG emulation without test equipment.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An apparatus for testing a media gateway control (MEGACO) protocol, comprising:

a test application controller generating a predetermined scenario required to test call processing performance of a media gateway controller or a media gateway;

a test engine unit selecting a function of the media gateway controller or the media gateway, and emulating virtual analog lines according to the scenario; and an MEGACO protocol processor processing calls of the analog lines using the selected media gateway controller or the media gateway.

2. The apparatus of claim 1, wherein the test application controller generates an analog line resource table listing data required for generation of the virtual analog lines.

3. The apparatus of claim 2, wherein in order to provide at least one virtual analog line for at least one media gateway and the at least one media gateway, the analog line resource table comprises an identifier field that enables classification of the virtual analog lines, an identifier field that enables classification of media gateways to which the virtual analog lines belong, an identifier field that enables classification of channels of the virtual analog lines, phone numbers of a transmitting party of the channels, phone numbers of a receiving party, and information regarding states of call connection.

4. The apparatus of claim 1, wherein the test engine unit provides at least one of the media gateway controller and the media gateway, and at least one virtual analog line for one of the media gateway controller and the media gateway.

5. The apparatus of claim 1, wherein the MEGACO protocol processor sets and releases call connection as defined with respect to the virtual analog lines in the scenario.

6. A method of testing a media gateway control (MEGACO) protocol, comprising:

(a) generating a predetermined scenario regarding a test of call processing performance of a media gateway controller or a media gateway;

(b) selecting a function of the media gateway controller or the media gateway and emulating virtual analog lines between the media gateway controller and the media gateway according to the scenario; and (c) testing the call processing performance of the media gateway controller or the media gateway using the virtual analog lines and the selected media gateway controller or the media gateway.

7. The method of claim 6, wherein (a) comprises generating an analog line resource table that includes data regarding the virtual analog lines required to execute the scenario.

8. The method of claim 7, wherein in order to provide at least one virtual analog line for at least one media gateway and the at least one media gateway, the analog line resource table comprises an identifier field that enables classification of the virtual analog lines, an identifier field that enables classification of media gateways to which the virtual analog lines belong, an identifier field that enables classification of channels of the virtual analog lines, phone numbers of a transmitting party of the channels, phone numbers of a receiving party, and information regarding states of call connection.

9. The method of claim 6, wherein (b) comprises providing at least one of the media gateway controller and the media gateway, and at least one virtual analog line for one of the media gateway controller and the media gateway.

10. The method of claim 6, wherein (c) comprises connecting a call and releasing the call, using a test engine unit that emulates the virtual analog lines and the media gateway or the media gateway controller to construct various test environments.

* * * * *